United States Patent [19]
Schwartz et al.

[11] Patent Number: 5,200,079
[45] Date of Patent: Apr. 6, 1993

[54] CIRCULAR CLARIFIER INCLUDING IMPROVED SKIMMER CLARIFIER

[75] Inventors: Robert E. Schwartz, Montgomery; Donald C. Vock, Batavia, both of Ill.

[73] Assignee: McNish Corporation, West Chicago, Ill.

[21] Appl. No.: 540,835

[22] Filed: Jun. 20, 1990

[51] Int. Cl.$^5$ .............................................. B01B 21/18
[52] U.S. Cl. ................................... 210/525; 210/528; 210/531; 210/541
[58] Field of Search ............... 210/525, 528, 529, 530, 210/531, 523, 541; 248/123.1, 281.1

[56] References Cited

U.S. PATENT DOCUMENTS

| | | | |
|---|---|---|---|
| 1,140,051 | 5/1915 | MacNaughton-Jones | 248/123.1 |
| 2,305,929 | 12/1942 | Lund et al. | 210/525 |
| 2,611,489 | 9/1952 | Scott | 210/528 |
| 2,734,710 | 2/1956 | Noble | 248/281.1 |
| 3,338,419 | 8/1967 | Smith | 210/528 |
| 3,371,788 | 3/1968 | Smith | 210/525 |
| 3,498,465 | 3/1970 | Klump et al. | 210/525 |
| 3,627,132 | 12/1971 | Kelly | 210/525 |

FOREIGN PATENT DOCUMENTS

| 23003 | 1/1981 | European Pat. Off. . |
|---|---|---|
| 499061 | 1/1939 | United Kingdom . |

OTHER PUBLICATIONS

National Hydro Systems Drawing No. D-26-308-b Nov. 1982.
National Hydro Systems Drawing D-32-781 Mar. 1987.
National Hydro Systems Drawing D-26-975 Apr. 1983.
National Hydro Systems Drawing C-32-885 Apr. 1987.
National Hydro Systems Drawing D-26-974 Apr. 1983.

*Primary Examiner*—Stanley S. Silverman
*Assistant Examiner*—Christopher Upton
*Attorney, Agent, or Firm*—Willian Brinks Olds Hofer Gilson & Lione

[57] ABSTRACT

A circular clarifier includes a skimmer assembly mounted on a rotatable arm of the clarifier. The skimmer assembly includes a parallelogram linkage having a pair of end links pivotably connected between upper and lower intermediate links. The skimmer blade is mounted to one of the end links to skim the liquid containing volume of the clarifier. The parallelogram linkage is mounted to the rotating arm by a support assembly at upper and lower pivot connections. These pivot connections are positioned at central portions of the respective intermediate links such that both of the intermediate links extend outwardly on both sides of the respective pivot connection. Either a counterweight or a floatation element is mounted to the parallelogram linkage to bias the linkage for rotation about the pivot connections to position the skimmer blade in an upper position.

2 Claims, 4 Drawing Sheets

CIRCULAR CLARIFIER INCLUDING IMPROVED SKIMMER CLARIFIER

BACKGROUND OF THE INVENTION

This invention relates to a circular clarifier for clarifying sludge containing influents, of the type having an improved skimmer assembly.

Sewage treatment facilities have for some time used circular clarifiers to clarify sludge containing influents. In the clarification process, solids sink to the bottom of the clarifier, where they are removed, and clarified effluent is removed from the upper part of the clarifier. Conventionally, solids at the base of the clarifier are removed with a rotating arm which may include scraper blades either alone or in combination with suction orifices for removing settled solids from the bottom of the clarifier.

Additionally, it is important to remove floating scum from the surface of the liquid in the clarifier to prevent the scum from passing out of the clarifier through the effluent removal means. In the past, such scum has been removed with a skimmer assembly mounted to the rotatable arm to sweep across the surface of liquid in the clarifier. One approach is to mount a scum removal conduit approximately at the liquid level and to use the rotating skimmer assembly to push floating scum into the conduit. In this arrangement, it is conventional to mount the skimmer assembly for vertical movement so that the skimmer assembly can move under the scum removal conduit as the rotating arm rotates past the conduit.

In the past, two basic arrangements have been used for allowing the skimmer assembly to move vertically. The first is a simple pivot arrangement, in which the skimmer blades are mounted on vertically extending arms which are mounted to pivot about a horizontal axis. Both counter weights and flotation elements have been mounted on such pivoting skimmer assemblies to provide a biasing force tending to return the skimmer blades to the raised position. Flotation elements that have been used in the past include sealed boxes containing a foam and having an opening on an upper surface thereof. This opening is sealed with a plug such as a threaded plug, and the effective flotation force can be easily adjusted as desired by altering the amount of liquid in the box.

A second linkage used for skimmer assemblies in the past is a parallelogram linkage. To the knowledge of the inventors, such parallelogram linkages have in the past included two vertical links, one directly under the skimmer blade and the other aligned with the support that interconnects the parallelogram linkage with the rotating arm. In the past, a counterweight has been cantilevered off of one of the intermediate links on the opposite side of the support from the skimmer blade. This arrangement has certain disadvantages. The cantilevered counterweight acts with a moment arm that is substantially smaller than the moment arm for the skimmer blade. With this arrangement the required mass of the counterweight is unnecessarily large, thereby increasing the cost, weight, and size of the skimmer assembly unnecessarily. Furthermore, such counterweights tend to be spaced at some distance from the design surface level of liquid in the clarifier, and they can only be exchanged with difficulty, after the clarifier has been drained or filled with clear water.

Accordingly, it is an object of this invention to provide an improved skimmer assembly for a clarifier of the type described above, which utilizes a parallelogram linkage yet avoids the foregoing problems.

SUMMARY OF THE INVENTION

According to this invention, a clarifier of the general type described above includes at least one skimmer assembly mounted on the rotatable arm to extend upwardly therefrom. The skimmer assembly comprises a parallelogram linkage having a pair of end links pivotably connected between upper and lower intermediate links. A skimmer blade is mounted to one of the end links to skim the liquid containing volume as the rotatable arm rotates. The parallelogram linkage is mounted to the rotatable arm by a support assembly which extends above the rotatable arm, and by upper and lower pivot connections between the support assembly and the upper and lower intermediate links, respectively.

According to a first feature of this invention, the upper and lower pivot connections are each positioned at a central portion of the respective intermediate link such that both of the intermediate links extend outwardly on both sides from the respective pivot connection. A return force generating means is mounted to the parallelogram linkage to bias the parallelogram linkage for rotation about the pivot connections to raise the skimmer blade. In one embodiment of this invention, the return force generating means comprises a counterweight mounted to the end link opposed to the end link to which the skimmer blade is mounted, and the moment arm of the counterweight is arranged to be greater than the moment arm of the skimmer blade. With this arrangement, the mass of the counterweight can be minimized, and a particularly robust construction is provided.

According to a second aspect of this invention, the parallelogram linkage is provided with return force generating means comprising a flotation element mounted to the one of the end links to which the skimmer blade is mounted. Preferably, this flotation element includes a container that is sealed and defines an opening on an upper side thereof removably sealed with a cap or plug. This opening allows material to be added to the container to vary the flotation forces generated by the flotation element.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
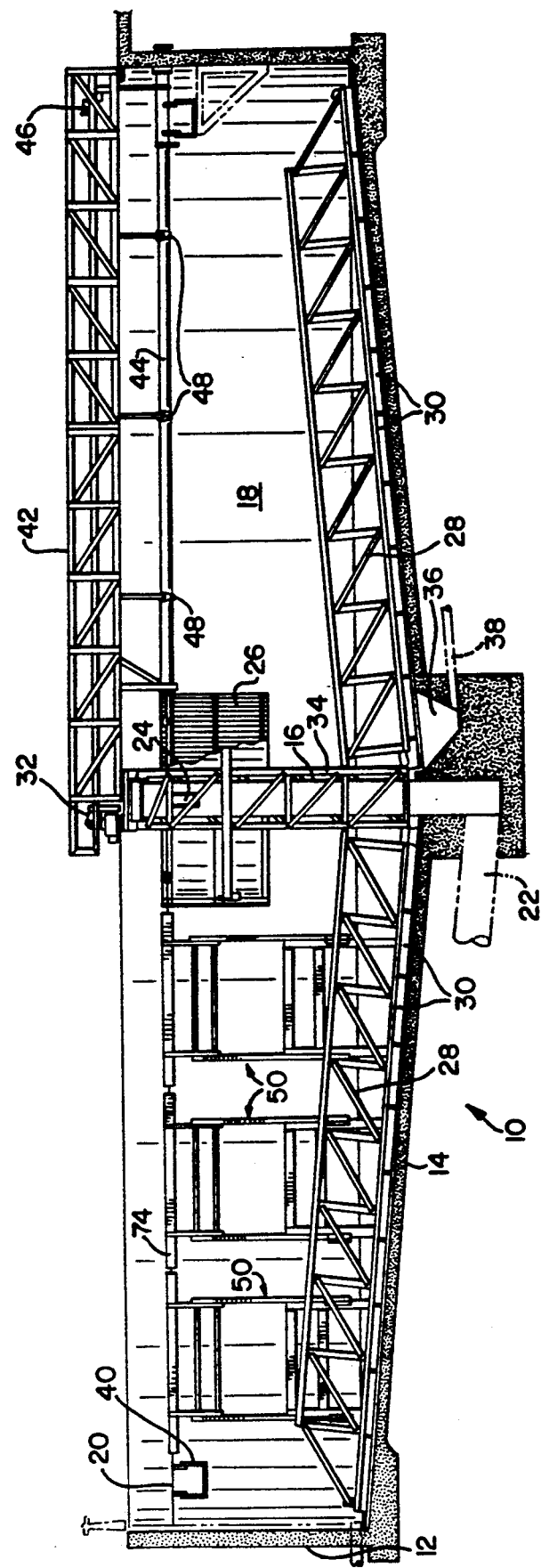
FIG. 1 is a sectional elevational view of a clarifier which incorporates a presently preferred embodiment of this invention.

Turning now to the drawings, FIG. 1 shows a clarifier 10 which is in all respects conventional except for the skimmer assembly described in detail below. In order to clarify the environment in which the skimmer assembly operates, the following discussion will first briefly describe the clarifier 10.

The clarifier 10 includes a circular peripheral wall 12 which surrounds a dished base 12. A column 16 rises from the center of the base 14 approximately to the elevation of the peripheral wall 12. The wall 12 and the base 14 combine to form a liquid containing volume 18 with an operational water level 20. Solids containing influent is introduced into the volume 18 by an influent conduit 22 which passes into the interior of the column 16. Influent enters the interior of the clarifier 10 via ports 24 near the upper end of the column 16. The portion of the volume 18 immediately around the upper end of the column 16 is bounded by a influent well 26 secured to the column 16.

The circular base 14 of the clarifier 10 is periodically swept by a pair of scraper arms 28, which each include a plurality of scraper blades 30 positioned to scrape solids from the base 14 and direct them inwardly, towards the column 16. The scraper arms 28 are slowly rotated by a drive assembly 32 mounted to the top of the column 16. The drive assembly 32 slowly rotates a vertically oriented drive cage 34, which transmits rotational forces to the scraper arms 28. The rotating scraper arms 28 move solids resting on the base 14 inwardly into a sludge removal well 36, from which solids are removed via a sludge removal conduit 38.

Clarified effluent is removed from the clarifier 10 via an effluent trough or conduit 40 which is annular in shape and extends around the upper portion of the peripheral wall 12.

Figure 2:
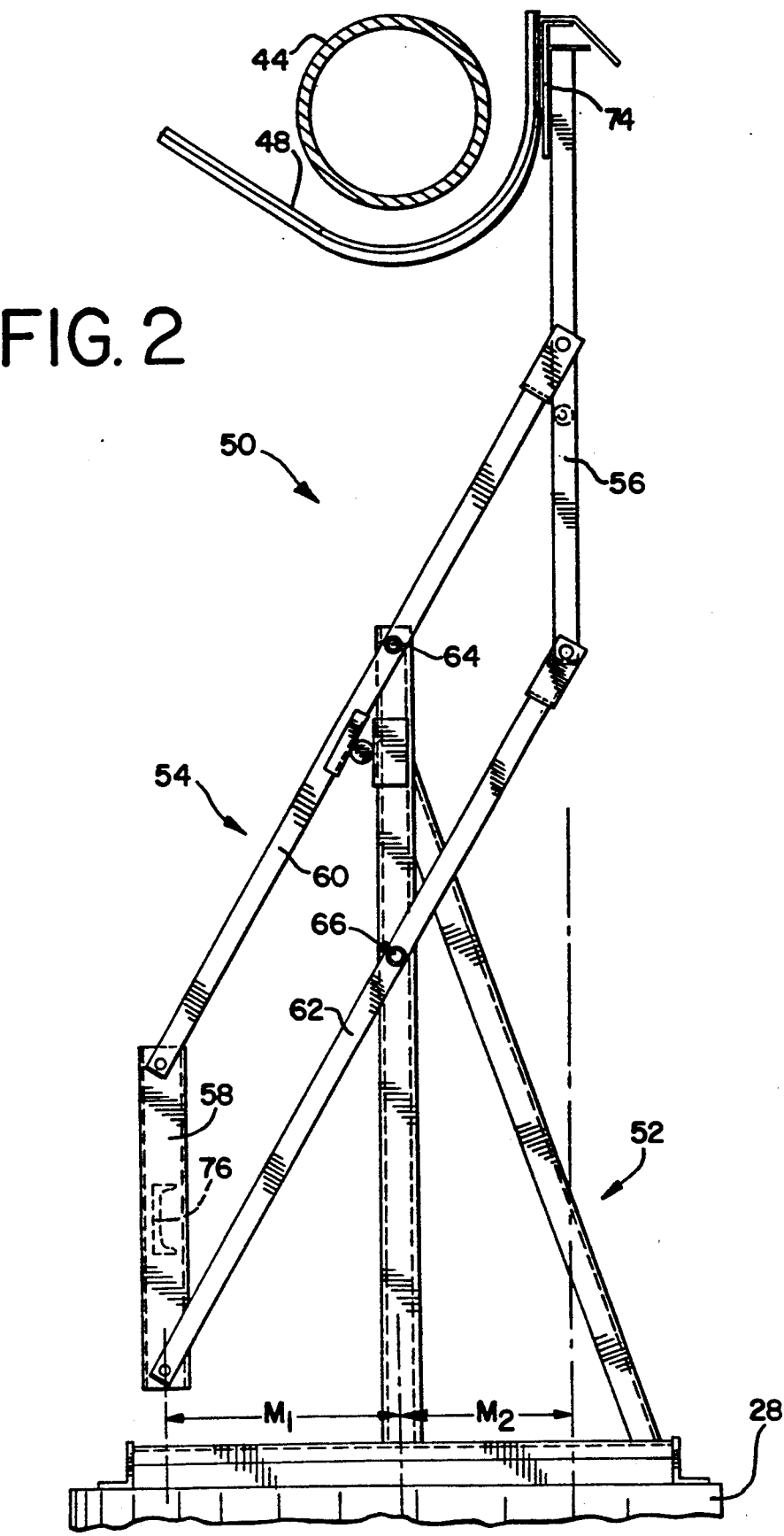
FIG. 2 is a side elevational view of a one of the skimmer assemblies of FIG. 1 in the raised position.

A truss bridge 42 extends between the upper end of the column 16 and the peripheral wall 12. This bridge 42 provides access to the drive assembly 32 and additionally serves to support a rotatable scum pipe 44 in place. The scum pipe 44 is mounted for rotation about its longitudinal axis, but remains in a fixed radial position with respect to the base 14. The scum pipe 44 includes an opening at its upper edge (FIG. 2). A scum pipe drive assembly 46 is provided to selectively rotate the scum pipe 44 about its longitudinal axis to lower this opening into a scum receiving position. The scum pipe 44 is partially surrounded by guides 48 intended to operate as described below to deflect the skimmer blade downwardly. As mentioned above, the foregoing elements of the clarifier 10 are conventional, and they have been described merely to define the environment of this invention.

According to this invention, an improved skimmer assembly 50 is provided for the clarifier 10. A first preferred embodiment of the skimmer assembly of this invention is shown at reference numeral 50 in FIGS. 2 and 3.

The skimmer assembly 50 is mounted on a support assembly 52 that is fixedly mounted to the rotating scraper arm 28. The skimmer assembly 50 includes a parallelogram linkage 54 made up of upper and lower end links 56, 58 which are vertically disposed, and upper and lower intermediate links 60, 62, which extend between the end links 56, 58. The inter-connections between each of the links 56-62 are pivotable.

The parallelogram linkage 54 is secured to the support assembly 52 by means of upper and lower pivot connections 64, 66. It should be noted that the pivot connections 64, 66 are positioned at central portions of the intermediate links 60, 62 such that the intermediate links 60, 62 extend outwardly from both sides of the pivot connections 64, 66.

Figure 4:
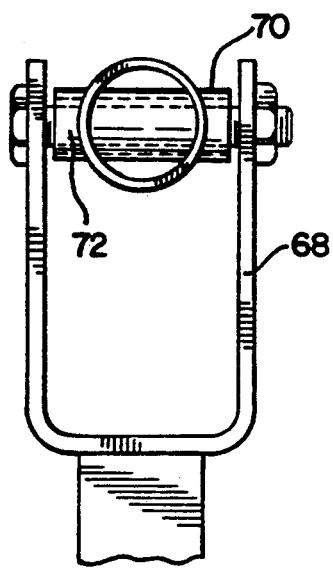
FIG. 4 is a cross-sectional view taken along line 4—4 of FIG. 2.

The pivot connections of the skimmer assembly 50 can be fabricated in a variety of ways. FIG. 4 shows one suitable arrangement which includes a yoke 68 that receives a sleeve 70 and a pin 72. The pin 72 provides a hinge or pivot axis allowing pivotable movement.

Figure 3:
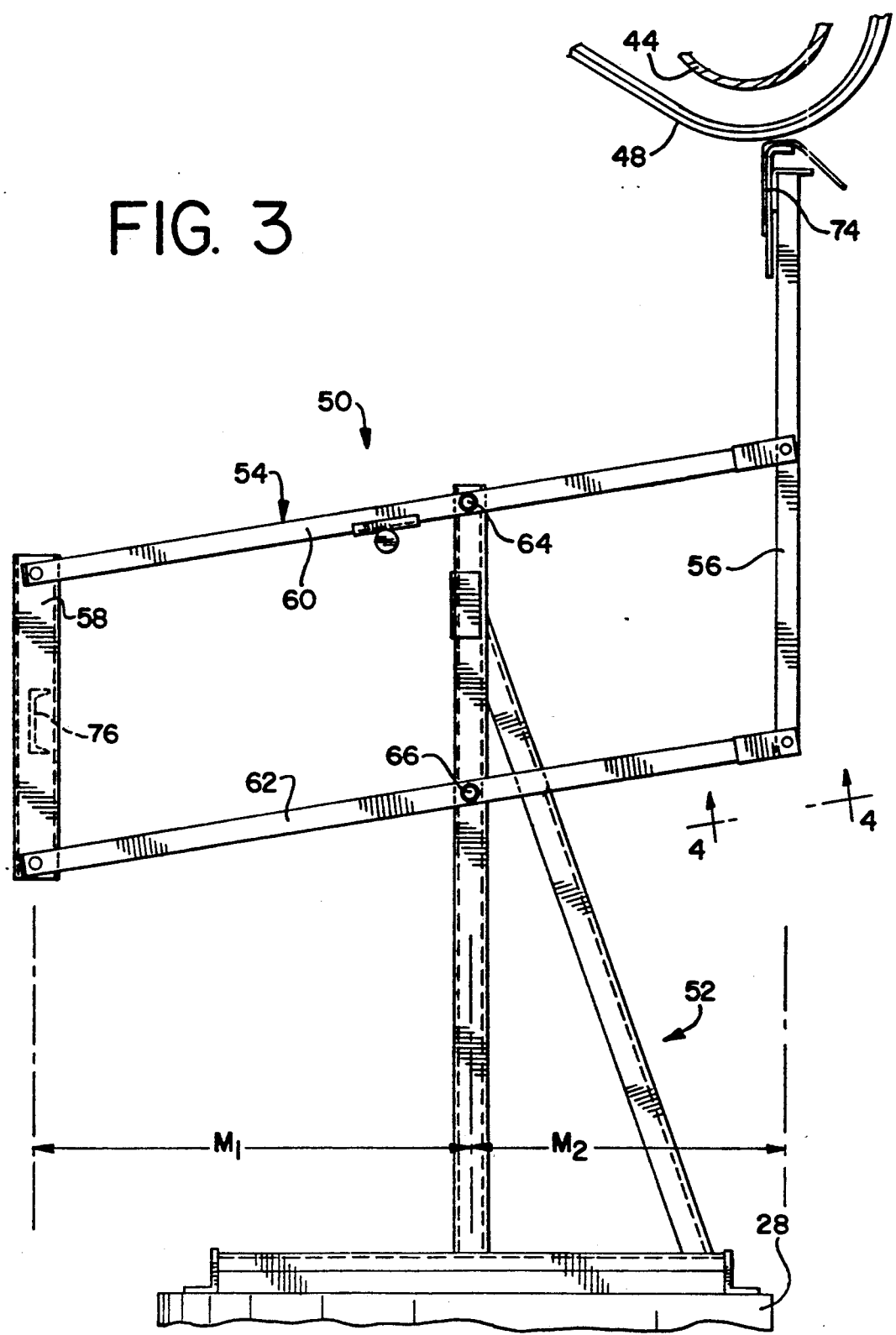
FIG. 3 is a side elevational view showing the skimmer assembly of FIG. 2 in the lowered position.

As shown in FIGS. 2 and 3, a skimmer blade 74 is mounted vertically above the upper end link 56, and a counterweight 76 is mounted to the lower end link 58. The counterweight 76 forms a return force generating means which biases the parallelogram linkage 54 for rotation about the pivot connections 64, 66 to the upper or raised position shown in FIG. 2.

FIG. 2 shows the normal operating position of the skimmer assembly 50, in which the skimmer blade 74 extends slightly above the water level. As the skimmer blade 74 sweeps around an annular portion of the surface area of the liquid in the clarifier 10, carried by the scraper arm 28, the skimmer blade 74 will repeatedly approach the scum pipe 44. When the skimmer blade comes into contact with the guide 48 as shown in FIG. 2, continued rotation of the scraper arm 28 will cause the skimmer blade 74 to move downwardly, to the position shown in FIG. 3, to allow the skimmer blade 74 to pass under the scum pipe 44. Forces applied by the guide 48 to the skimmer blade 74 overcome the biasing forces supplied by the counterweight 76 and push the skimmer blade 74 downwardly. Once the skimmer blade 74 has been moved past the guide 48 by the rotating scraper arm 28, the return force provided by the counterweight 76 restores the skimmer blade 74 to the raised position of FIG. 12.

Because the pivot connections 64, 66 are positioned at a central portion of the intermediate links 60, 62, the moment arm M1 of the counterweight 76 can easily be made greater that the moment arm M2 of the skimmer blade 74. For this reason, the mass of the counterweight 76 required to provide the desired return force is relatively small, and in this way the cost, size and weight of the skimmer assembly 50 are reduced.

Figure 5:
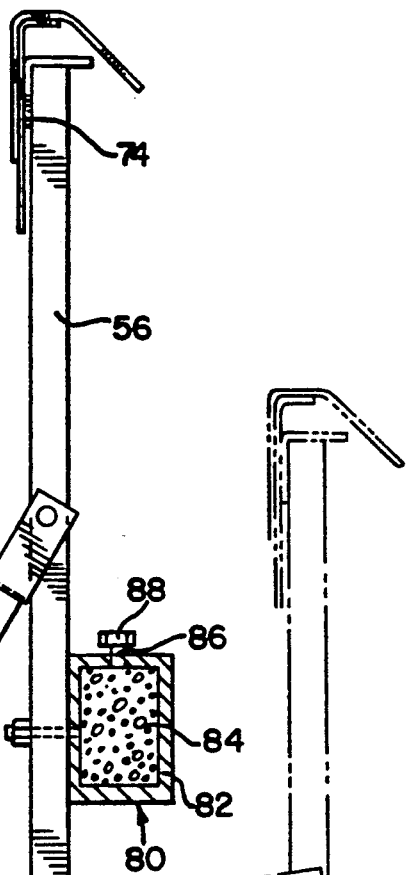
FIG. 5 is a side elevational view of a second preferred embodiment of the skimmer assembly of this invention.
Figure 5:
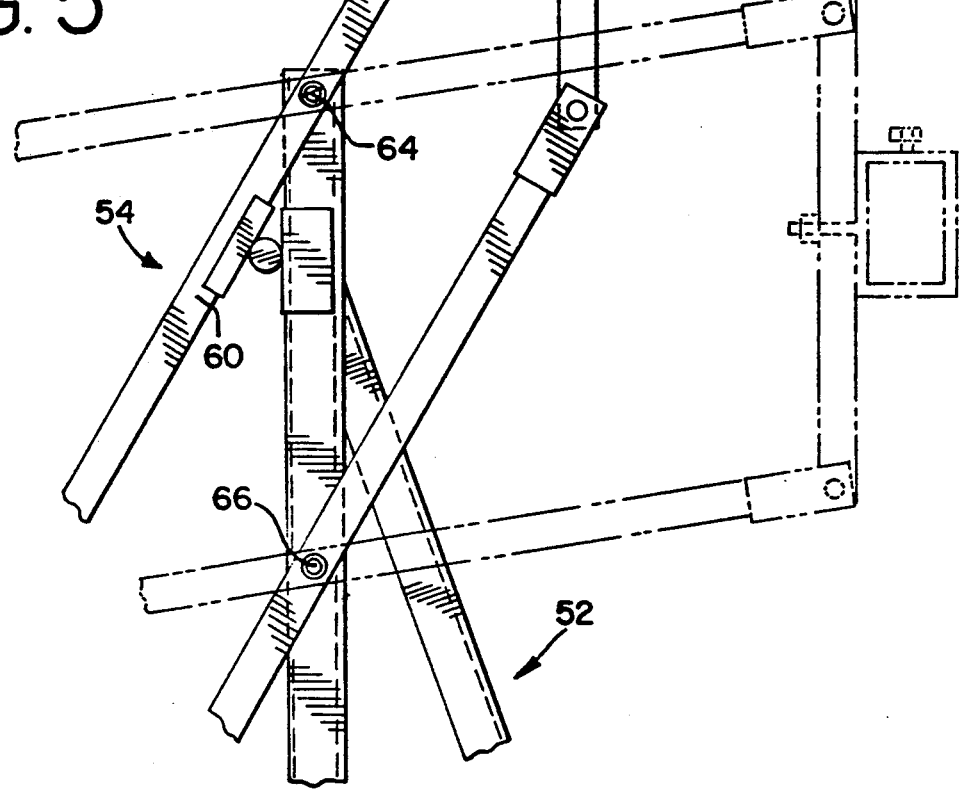

FIG. 5 shows a second preferred embodiment of this invention, which is substantially identical to the embodiment of FIGS. 2 and 3 except that the counterweight 76 has been deleted and replaced with a flotation element 80. The flotation element 80 is made up of a sealed container 82 filled with a foam 84. The container 82 defines an opening 86 at its upper surface, and this opening 86 is sealed by a treaded cap or plug 88. The flotation element 80 is at least partially air filled, and it generates a flotation force which acts as a return force, biasing the parallelogram linkage for rotation about the pivot connections 64, 66. The important advantage of the flotation element 80 as compared with the counterweight 76 is that the return force provided by the flotation element 80 can readily be adjusted, without draining the clarifier 10. This can be accomplished by gaining access to the cap 88, and removing the cap 88 to add or remove a material such as an oil from the sealed container 82 to adjust the return force. The advantages of the flotation element 80 can also be obtained with other types of parallelogram linkages, including those having the upper and lower pivot connections with the support arm positioned at one extreme end of the intermediate links.

Of course, it should be understood that a wide range of changes and modifications can be made to the preferred embodiments described above. It is therefore intended that the foregoing detailed description be regarded as illustrative, and that it be understood that it is the following claims, including all equivalents, which are intended to define the scope of this invention.

We claim:

1. In a clarifier of the type comprising a peripheral wall and a base that cooperate to define a liquid retaining volume, an influent conduit for introducing influent into the volume, an effluent conduit for removing clarified effluent from the volume, means including at least one rotatable arm for removing sludge from a lower portion of the volume, means including at least one scum removal conduit for removing scum from the volume, and means for rotating the rotatable arm to sweep the rotatable arm across the base and under the sum removal conduit, the improvement comprising:

at least one skimmer assembly mounted on the rotatable arm to extend upwardly therefrom, said skimmer assembly comprising:

a parallelogram linkage having a pair of end links pivotably connected between upper and lower intermediate links;

a skimmer blade mounted to one of the end links to skim the liquid containing volume as the rotatable arm rotates;

a support assembly mounted to extend above the rotatable arm;

an upper pivot connection between the support assembly and the upper intermediate link;

a lower pivot connection between the support assembly and the lower intermediate link;

said upper and lower pivot connections each positioned at a central portion of the respective intermediate link such that both of the intermediate links extend outwardly on both sides from the respective pivot connection; and a counterweight mounted to the other of the end links of the parallelogram linkage, opposed to the one of the end links to which the skimmer blade is mounted, for biasing the parallelogram linkage for rotation about the pivot connections to bias the skimmer blade upwardly.

2. The invention of claim 1, wherein the counterweight acts with a first moment arm to pivot the parallelogram linkage in a skimmer blade raising direction, wherein the skimmer blade acts with a second moment arm to pivot the parallelogram linkage in a skimmer blade lowering direction, and wherein the first moment arm is greater than the second moment arm.

* * * * *

UNITED STATES PATENT AND TRADEMARK OFFICE
CERTIFICATE OF CORRECTION

PATENT NO. : 5,200,079
DATED : April 6, 1993
INVENTOR(S) : Robert E. Schwartz et al.

It is certified that error appears in the above-indentified patent and that said Letters Patent is hereby corrected as shown below:

Column 5:

In claim 1, line 16, delete "sum" and substitute therefor --scum--.

Signed and Sealed this

Twenty-sixth Day of April, 1994

Attest:

BRUCE LEHMAN

Attesting Officer     Commissioner of Patents and Trademarks